(12) United States Patent
Hasegawa et al.

(10) Patent No.: US 12,350,684 B2
(45) Date of Patent: Jul. 8, 2025

(54) PRODUCTION METHOD AND PRODUCTION DEVICE FOR RESIN POWDER OR INORGANIC POWDER

(71) Applicant: TOAGOSEI CO., LTD., Tokyo (JP)

(72) Inventors: Takashi Hasegawa, Nagoya (JP); Masaya Kuno, Nagoya (JP); Takahiro Fujii, Nagoya (JP); Masanori Hiromoto, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 18/717,208

(22) PCT Filed: Dec. 15, 2022

(86) PCT No.: PCT/JP2022/046152
§ 371 (c)(1),
(2) Date: Jun. 6, 2024

(87) PCT Pub. No.: WO2023/120349
PCT Pub. Date: Jun. 29, 2023

(65) Prior Publication Data
US 2025/0041875 A1 Feb. 6, 2025

(30) Foreign Application Priority Data
Dec. 22, 2021 (JP) ................. 2021-207850

(51) Int. Cl.
*B03C 1/26* (2006.01)
*B07B 1/46* (2006.01)

(52) U.S. Cl.
CPC .............. *B03C 1/26* (2013.01); *B07B 1/4609* (2013.01); *B03C 2201/20* (2013.01)

(58) Field of Classification Search
CPC ...... B03C 1/26; B03C 2201/20; B07B 1/4609

USPC .......................................... 209/213
See application file for complete search history.

(56) References Cited

FOREIGN PATENT DOCUMENTS

| CN | 108745855 A | * | 11/2018 | ............... B07B 1/22 |
|---|---|---|---|---|
| JP | H07-289994 A | | 11/1995 | |
| JP | 2004332109 A | * | 11/2004 | |
| JP | 2005-313038 A | | 11/2005 | |
| JP | 2020-065986 A | | 4/2020 | |
| JP | 7289994 B2 | * | 6/2023 | ........... B01D 15/206 |
| WO | WO-2023120349 A1 | * | 6/2023 | ............... B03C 1/26 |

OTHER PUBLICATIONS

International Search Report issued in PCT/JP2022/046152; mailed Feb. 14, 2023.

* cited by examiner

*Primary Examiner* — Terrell H Matthews
(74) *Attorney, Agent, or Firm* — Studebaker Brackett PLLC

(57) ABSTRACT

The present invention provides a method and an apparatus for producing a resin powder or an inorganic powder and capable of easily removing the metal component generated from the sieving wire mesh itself in addition to space saving and a high processing speed in the sieving step while maintaining the classification capacity of the sieving wire mesh. The method including: a sieving step of sieving a resin powder to be processed or an inorganic powder to be processed using a sieving wire mesh having a Vickers hardness of 220 HV or more; and a magnetic separation step of removing, from a resin powder or an inorganic powder containing a metal component after the sieving step, the metal component using a magnetic separator. The apparatus including: a sieving wire mesh having a Vickers hardness of 220 HV or more; and a magnetic separator.

5 Claims, No Drawings

PRODUCTION METHOD AND PRODUCTION DEVICE FOR RESIN POWDER OR INORGANIC POWDER

TECHNICAL FIELD

The present invention relates to a method and an apparatus for producing a resin powder or an inorganic powder.

BACKGROUND ART

A resin powder or an inorganic powder is used in various applications such as electric and electronic equipment and automobile fields.

In a production step of a resin powder or an inorganic powder, in order to obtain a powder having a desired particle diameter, a step (hereinafter, also referred to as a "sieving step") of installing a sieve screen having a classifiable mesh opening and separating particles having a certain particle size or more by a sieving operation to remove aggregates of the powder, or foreign matters mixed in the production step is introduced.

In recent years, in order to enhance handleability and functionality of a resin powder or an inorganic powder, it is required to make the particle diameter uniform and the particle diameter small, and a level of requirement for removal of foreign matters such as metal components by the sieving step has increased. However, when obtaining a resin powder or an inorganic powder having a small particle diameter, a sieving speed is reduced, and the step is often a rate-determining step in an entire plant.

Examples of general means for solving the above-described rate-determining step include increasing a sieving area or increasing a mesh opening of the sieve screen, but the former has a problem that there is a limitation on an installation space and a producible size of the sieve screen, and the latter has a problem that classification capacity is lowered.

As a method for solving the problem of such a sieving step, an ultrasonic vibration sieving machine disclosed in Patent Literature 1 is known, which is characterized in that a metal sieve mesh is fixed to an upper surface of a resonance ring provided in a vibration container with an adhesive, a synthetic resin sieve mesh is stretched on the sieve mesh so as to overlap the sieve mesh in a non-bonded state, and the number of meshes of the metal sieve mesh is 100 to 200 mesh. It is described that since high-frequency vibration from the resonance ring is transmitted through a wire mesh due to this feature, processing capability is high, and even fine powder sieving can be handled by setting a resin mesh.

CITATION LIST

Patent Literature

Patent Literature 1: JP-A-2005-313038

SUMMARY OF INVENTION

Problems to be Solved by Invention

As described above, in Patent Literature 1, although the processing capacity of the sieving step can be improved, there is a problem that a metal component generated from a sieving wire mesh due to the transmitted vibration is mixed into a resin powder product or an inorganic powder product as foreign matter.

The present invention has been made in view of such circumstances, and an object of the present invention is to provide a method and an apparatus for producing a resin powder or an inorganic powder and capable of easily removing the metal component generated from the sieving wire mesh itself in addition to space saving and a high processing speed in the sieving step while maintaining the classification capacity of the sieving wire mesh.

As a result of intensive studies to solve the above problems, the present inventors have found that, as the method for producing the resin powder or the inorganic powder, a method including a sieving step using a sieving wire mesh having a Vickers hardness of a specific value or more and a removal step of removing the metal component using a magnetic separator can easily remove the metal component while improving the processing capacity of the sieving step, and have completed the present invention.

The present invention is as follows.

[1] A method for producing a resin powder or an inorganic powder, the method including: a sieving step of sieving a resin powder to be processed or an inorganic powder to be processed using a sieving wire mesh having a Vickers hardness of 220 HV or more; and a magnetic separation step of removing, from a resin powder or an inorganic powder containing a metal component after the sieving step, the metal component using a magnetic separator.

[2] The production method according to [1], in which a tensile strength of a material constituting the sieving wire mesh is 500 N/mm$^2$ or more.

[3] The production method according to [1] or [2], in which the resin powder contains a crosslinked polymer.

[4] The production method according to [3], in which the crosslinked polymer is a water-absorbing resin.

[5] The production method according to [1] or [2], in which the inorganic powder contains an inorganic ion exchanger.

[6] An apparatus for producing a resin powder or an inorganic powder, the apparatus including: a sieving wire mesh having a Vickers hardness of 220 HV or more; and a magnetic separator.

[7] The apparatus for producing the resin powder or the inorganic powder according to [6], in which a tensile strength of a material constituting the sieving wire mesh is 500 N/mm$^2$ or more.

Effects of Invention

According to the production method and the production apparatus of the present invention, it is possible to easily remove the metal component generated from the sieving wire mesh itself in addition to the space saving and the high processing speed in the sieving step while maintaining the classification capability of the sieving wire mesh, thereby producing a high-purity resin powder product or inorganic powder product.

DESCRIPTION OF EMBODIMENTS

A method for producing a resin powder or an inorganic powder according to the present invention includes: a sieving step of sieving a resin powder to be processed or an inorganic powder to be processed using a sieving wire mesh having a Vickers hardness of 220 HV or more; and a magnetic separation step of removing, from a resin powder or an inorganic powder containing a metal component after the sieving step, the metal component using a magnetic separator.

The apparatus for producing the resin powder or the inorganic powder of the present invention includes: a sieve wire mesh having a Vickers hardness of 220 HV or more; and a magnetic separator.

Hereinafter, each of the resin powder, the inorganic powder, the sieving step and the sieving wire mesh, and the magnetic separation step and the magnetic separator will be described in detail.

In the present specification, "(meth)acryl" means acryl and/or methacryl, and "(meth)acrylate" means acrylate and/or methacrylate. In addition, the "(meth)acryloyl group" means an acryloyl group and/or a methacryloyl group.

1. Resin Powder

The resin powder is not particularly limited, and examples thereof include (meth)acrylic resin powders, polyester-based resin powders, and epoxy-based resin powders.

Further, the resin powder may be a non-crosslinked polymer or a crosslinked polymer, but is preferably a crosslinked polymer from the viewpoint of obtaining a large effect of the present invention, and the crosslinked polymer is preferably a water-absorbing resin.

Here, the water-absorbing resin is usually a lightly crosslinked polymer, and examples thereof include starch-based water-absorbing resins such as completely neutralized polyacrylic acid, partially neutralized polyacrylic acid, completely neutralized acrylic acid-acrylic acid ester copolymer, partially neutralized products of acrylic acid-acrylic acid ester copolymer, hydrolyzed starch-acrylonitrile graft copolymer, and neutralized starch-acrylic acid graft copolymer, and saponified vinyl acetate-acrylic acid ester copolymer.

The water-absorbing resin has a structural unit derived from an ethylenically unsaturated carboxylic acid monomer (hereinafter, also referred to as "component (a)"), and a monomer component containing the component (a) can be introduced into a polymer by a known polymerization reaction such as solution polymerization, reversed phase suspension polymerization, precipitation polymerization, or dispersion polymerization.

Then, a water-absorbing resin composition obtained by the polymerization reaction is dried by a dryer to produce a particulate resin powder.

Examples of the component (a) include: (meth)acrylic acid, itaconic acid, crotonic acid, maleic acid, fumaric acid; (meth)acrylamidoalkyl carboxylic acid such as (meth)acrylamidohexanoic acid and (meth)acrylamidododecanoic acid; and carboxyl group-containing ethylenically unsaturated monomers such as monohydroxyethyl succinate (meth)acrylate, ω-carboxy-caprolactone mono(meth)acrylate, and β-carboxyethyl (meth)acrylate, and (partially) alkali-neutralized products thereof, and one of these may be used alone, or two or more thereof may be used in combination. Among the above, a compound having an acryloyl group as a polymerizable functional group is preferable, and acrylic acid is particularly preferable, in that a polymer having a long primary chain length is obtained due to a high polymerization rate. When acrylic acid is used as the ethylenically unsaturated carboxylic acid monomer, a polymer having a high carboxyl group content can be obtained.

Note that the content of the component (a) in the water-absorbing resin is preferably 50 mass % or more relative to all structural units of the water-absorbing resin. Further, when the component (a) is neutralized, the degree of neutralization is preferably 30 to 95 mol % of carboxyl groups of the component (a).

A crosslinking method in the crosslinked polymer is not particularly limited, and examples thereof include the following methods.

1) Copolymerization of crosslinkable monomer (however, different form the polyfunctional crosslinking agent)
2) Utilization of chain transfer to polymer chain during radical polymerization Among the above, a method by copolymerization of the crosslinkable monomer is preferable from the viewpoint of easy operation and easy control of the degree of crosslinking.

<Crosslinkable Monomer>

Examples of the crosslinkable monomer include a polyfunctional polymerizable monomer having two or more polymerizable unsaturated groups, and a monomer having a self-crosslinkable functional group such as a hydrolyzable silyl group.

The polyfunctional polymerizable monomer is a compound having two or more polymerizable functional groups such as a (meth)acryloyl group and an alkenyl group in the molecule, and examples thereof include a polyfunctional (meth)acryloyl compound, a polyfunctional alkenyl compound, and a compound having both a (meth)acryloyl group and an alkenyl group. Only one of these may be used alone, or two or more thereof may be used in combination. Among them, from the viewpoint of easily obtaining a uniform crosslinked structure, the polyfunctional alkenyl compound is preferable, and a polyfunctional allyl ether compound having two or more allyl ether groups in the molecule is particularly preferable.

Examples of the polyfunctional (meth)acryloyl compound include di(meth)acrylates of dihydric alcohols such as ethylene glycol di(meth)acrylate, propylene glycol di(meth)acrylate, 1,6-hexanediol di(meth)acrylate, polyethylene glycol di(meth)acrylate, and polypropylene glycol di(meth)acrylate; poly(meth)acrylates such as tri(meth)acrylate and tetra(meth)acrylate of polyhydric alcohols of trihydric or higher such as trimethylolpropane tri(meth)acrylate, tri(meth)acrylate of trimethylolpropane ethylene oxide modified product, glycerin tri(meth)acrylate, pentaerythritol tri(meth)acrylate, and pentaerythritol tetra(meth)acrylate; and bisamides such as methylene bisacrylamide and hydroxyethylene bisacrylamide.

Examples of the polyfunctional alkenyl compound include: polyfunctional allyl ether compounds such as trimethylolpropane diallyl ether, trimethylolpropane triallyl ether, pentaerythritol diallyl ether, pentaerythritol triallyl ether, tetraallyloxyethane, and polyallylsaccharose; polyfunctional allyl compound such as diallyl phthalate; and polyfunctional vinyl compounds such as divinylbenzene.

Examples of the compound having both a (meth)acryloyl group and an alkenyl group include allyl (meth)acrylate, isopropenyl (meth)acrylate, butenyl (meth)acrylate, pentenyl (meth)acrylate, and 2-(2-vinyloxyethoxy)ethyl (meth)acrylate.

Specific examples of the monomer having a self-crosslinkable functional group include a hydrolyzable silyl group-containing vinyl monomer and N-methoxyalkyl (meth)acrylamide. One of these compounds can be used alone, or two or more thereof can be used in combination.

The hydrolyzable silyl group-containing vinyl monomer is not particularly limited as long as it is a vinyl monomer having at least one hydrolyzable silyl group. Examples of the hydrolyzable silyl group-containing vinyl monomer include: vinylsilanes such as vinyltrimethoxysilane, vinyltriethoxysilane, vinylmethyldimethoxysilane, and vinyldimethylmethoxysilane; silyl group-containing acrylic acid esters such as trimethoxysilylpropyl acrylate, triethoxysilylpropyl acrylate, and methyldimethoxysilylpropyl acrylate; silyl group-containing methacrylic acid esters such as trimethoxysilylpropyl methacrylate, triethoxysilylpropyl methacrylate, methyldimethoxysilylpropyl methacrylate, and dimethylmethoxysilylpropyl methacrylate; silyl group-containing vinyl ethers such as trimethoxysilylpropyl vinyl ether; and silyl group-containing vinyl esters such as vinyl trimethoxysilylundecanoate.

When the present crosslinked polymer is crosslinked with the crosslinkable monomer, an amount of the crosslinkable monomer used is, for example, 0.01 parts by mass or more and 15.0 parts by mass or less, for example, 0.05 parts by mass or more and 10.0 parts by mass or less, for example, 0.1 parts by mass or more and 7.5 parts by mass or less, for example, 0.1 parts by mass or more and 5.0 parts by mass or less, or for example, 0.5 parts by mass or more and 2.5 parts by mass or less, relative to 100 parts by mass of the total amount of monomers (non-crosslinkable monomers) other than the crosslinkable monomer.

The amount of the crosslinkable monomer used is, for example, 0.001 to 2.5 mol %, for example, 0.01 to 2.0 mol %, for example, 0.05 to 1.75 mol %, for example, 0.05 to 1.5 mol %, or for example, 0.1 to 1.0 mol %, relative to the total amount of monomers (non-crosslinkable monomers) other than the crosslinkable monomer.

A shape of the resin powder is not particularly limited. Note that as for a size of the resin powder, when the resin powder is a granular material, an average primary particle diameter, which is a particle diameter at a volume-based frequency integrated value of 50% measured by a laser diffraction particle size distribution measuring machine, is, for example, 0.05 to 100 μm, for example, 0.10 to 50 μm, or for example, 0.20 to 30 μm.

2. Inorganic Powder

The inorganic powder is not particularly limited as long as it does not have magnetism, and examples of the inorganic powder are inorganic fillers including: silicates such as kaolin, clay, talc, mica, sericite, and bentonite; carbonates such as calcium carbonate, magnesium carbonate, and barium carbonate; sulfates such as calcium sulfate and barium sulfate; chromate such as strontium chromate and pigment yellow; molybdates such as zinc molybdate, calcium zinc molybdate, and magnesium molybdate; metal oxides such as aluminum oxide, antimony oxide, titanium oxide, cobalt oxide, zirconium oxide, trilead tetraoxide, lead monoxide, chromium oxide green, tungsten trioxide, and yttrium oxide; metal hydroxides such as aluminum hydroxide, magnesium hydroxide, and calcium hydroxide; and metal carbides such as silicon carbide, tungsten carbide, boron carbide, and titanium carbide.

In addition, examples of the inorganic powder are inorganic ion exchangers such as zeolites, amorphous composite oxides, amorphous active oxides, composites containing at least one atom selected from Ag, Cu, Zn and Mn, and hydrotalcite calcined products.

2-1. Zeolite

The zeolite is preferably a synthetic zeolite. The zeolite is insoluble or poorly soluble in water, and has an excellent adsorption effect on a basic compound.

Although a structure of the zeolite is diverse, any known zeolite can be used, and examples of the structure include A type, X type, Y type, a type, R type, MFI type, ZSM-5, and amorphous.

2-2. Amorphous Composite Oxide

The amorphous composite oxide is a compound other than the zeolite described above, and is preferably an amorphous composite oxide made of at least two selected from $Al_2O_3$, $SiO_2$, MgO, CaO, SrO, BaO, ZnO, $ZrO_2$, $TiO_2$, $WO_2$, $CeO_2$, $Li_2O$, $Na_2O$, $K_2O$, and the like.

Being amorphous means that no clear diffraction signal based on a crystal plane is observed when powder X-ray diffraction measurement is performed, and specifically, a (so-called sharp) signal peak with high kurtosis hardly appears in an X-ray diffraction chart in which a diffraction angle is plotted on a horizontal axis and a diffraction signal intensity is plotted on a vertical axis.

The amorphous composite oxide is insoluble or poorly soluble in water, and has an excellent adsorption effect on the basic compound. Among them, aluminum silicate which is the amorphous composite oxide made of $Al_2O_3$ and $SiO_2$ is preferable from the viewpoint of obtaining a large adsorption effect.

2-3. Amorphous Active Oxide

The amorphous active oxide is a compound not containing the amorphous composite oxide, and is preferably insoluble or poorly soluble in water, and has an excellent adsorption effect on an acidic compound or a sulfur-containing compound. Specific examples of the amorphous active oxide include $Al_2O_3$, $SiO_2$, MgO, CaO, SrO, BaO, ZnO, CuO, MnO, $ZrO_2$, $TiO_2$, $WO_2$, and $CeO_2$.

Further, a surface-treated active oxide can also be used. Specific examples of the surface-treated product include an active oxide surface-treated with an organopolysiloxane, and an active oxide having a surface coated with an oxide or hydroxide of aluminum, silicon, zirconium, or tin. Surface treatment with an organic material such as organopolysiloxane is preferable because adsorption performance is higher than that of surface treatment with an inorganic material.

2-4. Composite containing at least one atom selected from Ag, Cu, Zn, and Mn

The composite containing at least one atom selected from Ag, Cu, Zn, and Mn is a composite insoluble or poorly soluble in water, and has an excellent adsorption effect on the sulfur-containing compound.

The composite is a composite material including at least one selected from at least one atom selected from Ag, Cu, Zn, and Mn and a compound containing the atom, and another material.

The compound containing at least one atom of Ag, Cu, Zn, and Mn is preferably a salt of an inorganic acid such as an oxide, a hydroxide, phosphoric acid, or sulfuric acid, or a salt of an organic acid such as acetic acid, oxalic acid, or acrylic acid. Therefore, it is possible to use a water-insoluble composite in which at least one metal selected from Ag, Cu, Zn, and Mn or the compound is supported on a carrier including an inorganic compound as another material. Preferred inorganic compounds as the carrier are silica, phosphate of tetravalent metal, zeolite, and the like.

The phosphate of the tetravalent metal is preferably a compound represented by the following general formula (1). This compound is insoluble or poorly soluble in water, and has an excellent deodorizing effect on the basic compound.

$$H_aM_b(PO_4)_c \cdot nH_2O \qquad (1)$$

(where M is a tetravalent metal atom, a, b, and c are integers satisfying the formula: a+4b=3c, and n is 0 or a positive integer)

Examples of M in the general formula (1) include Zr, Hf, Ti, and Sn.

Preferable specific examples of the phosphate of the tetravalent metal include zirconium phosphate ($Zr(HPO_4)_2 \cdot H_2O$), hafnium phosphate, titanium phosphate, and tin phosphate. These compounds include crystalline and amorphous compounds having various crystal systems such as α-type crystal, β-type crystal, and γ-type crystal, and any of these compounds can be preferably used.

Among them, a composite in which at least one of atoms selected from Ag, Cu, Zn, and Mn is supported on the phosphate of the tetravalent metal, and a composite in which at least one of atoms selected from Ag, Cu, Zn, and Mn is supported on silica are preferable from the viewpoint of obtaining a large adsorption effect, and examples thereof include Ag-supported zirconium phosphate and Cu-supported silica.

2-5. Hydrotalcite Calcined Product

The hydrotalcite calcined product is a compound obtained by calcining a hydrotalcite compound at about 400° C. or higher.

The hydrotalcite compound is a layered compound represented by the following general formula (2).

(where $M^{2+}$ represents a divalent metal, $M^{3+}$ represents a trivalent metal, $A^{n-}$ represents an anion, and a, b, c, d, and n are positive numbers)

Specific examples of the hydrotalcite compound include $Zn_{4.5}Al_2(OH)_{13}CO_3 \cdot 3.5H_2O$, $Ni_{4.5}Al_2(OH)_{13}CO_3 \cdot 3.5H_2O$, $Mg_{4.5}Fe_2(OH)_{13}CO_3 \cdot 3.5H_2O$, $Mg_{4.5}Al_2(OH)_{13}CO_3 \cdot 3.5H_2O$, $Mg_5Al_{1.5}(OH)_{12.5}CO_3 \cdot 3.5H_2O$, $Mg_6Al_2(OH)_{16}CO_3 \cdot 4H_2O$, and $Mg_{4.3}Al_2(OH)_{12.6}CO_3 \cdot 4H_2O$.

The hydrotalcite calcined product is a substance obtained by desorbing anions in the structure by calcining the hydrotalcite compound, and represented by

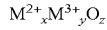

($M^{2+}$ represents a divalent metal, $M^{3+}$ represents a trivalent metal, and x, y, and z are positive numbers).

Specific examples of the hydrotalcite calcined product include $Zn_{0.7}Al_{0.3}O_{1.15}$, $Ni_{0.7}Al_{0.3}O_{1.15}$, $Mg_{0.7}Al_{0.3}O_{1.15}$, $Mg_{0.7}Fe_{0.3}O_{1.15}$, $Mg_{0.8}Al_{0.24}O_{1.16}$, $Mg_{0.9}Al_{0.3}O_{1.35}$, and $Mg_{0.6}Al_{0.3}O_{1.05}$.

The inorganic powder may be the inorganic filler or the inorganic ion exchanger, but is preferably the inorganic ion exchanger from the viewpoint of obtaining a large effect of the present invention.

A shape of the inorganic powder is not particularly limited. Note that as for a size of the inorganic powder, when the inorganic powder is a granular material, the average primary particle diameter, which is the particle diameter at the volume-based frequency integrated value of 50% measured by the laser diffraction particle size distribution measuring machine, is, for example, 0.05 to 100 μm, for example, 0.10 to 50 μm, or for example, 0.20 to 30 μm.

3. Sieving Step and Sieving Wire Mesh

This step is a step of using a sieving wire mesh (hereinafter also referred to as "this sieving wire mesh") having a Vickers hardness of 220 HV or more to separate particles having a certain particle size or more by sieving using the sieving wire mesh in order to remove aggregates of the resin powder or the inorganic powder, or foreign matters mixed in the step, and for example, metallic particles having a size of more than 100 μm can be removed, and the metal component can be efficiently removed in the subsequent magnetic separation step.

Here, before this step, a pulverization step of pulverizing the resin powder to be processed or the inorganic powder to be processed may be introduced. The pulverization step is performed as necessary so that the sieving step and/or the magnetic separation step of the resin powder to be processed or the inorganic powder to be processed can be favorably performed in the subsequent sieving step. The pulverization step may be performed using a known pulverizing apparatus.

A sieving method in the sieving step is not particularly limited, and various known sieving methods can be used. For example, a vibration method using ultrasonic waves or the like, a method using wind power, a method using forced stirring, or the like can be appropriately selected and used.

The sieving step can be performed to the extent that, for example, particles having a diameter of more than about 100 μm are separated. Typically, separation can be performed using a mesh having a mesh opening of 100 μm. Thus, particles having a size of more than 100 μm can be efficiently removed from the resin powder to be processed or the inorganic powder to be processed. The sieving step can also be performed as one aspect of the step of removing the metal component in that the metallic particles having a size of more than 100 μm can also be removed.

Examples of materials constituting this sieving wire mesh include copper, a titanium alloy, and stainless steel such as SUS431 and SUS3291J1.

The Vickers hardness of this sieving wire mesh is preferably 240 HV or more, more preferably 260 HV or more, still more preferably 280 HV or more, and even more preferably 300 HV or more from the viewpoint that processing speed in the sieving step can be increased. An upper limit of the Vickers hardness is not particularly limited, but is, for example, 1,000 HV or less, or for example, 750 HV or less. Note that the Vickers hardness of this sieving wire mesh can be measured by a measurement method according to JIS Z 2244:2009 (Vickers hardness test-Test method).

A tensile strength of the material constituting this sieving wire mesh is preferably 500 N/mm² or more, more preferably 550 N/mm² or more, still more preferably 600 N/mm² or more, and even more preferably 700 N/mm² or more in that durability of the sieving wire mesh and the processing speed in the sieving step can be improved. The upper limit of the tensile strength is not particularly limited, but is, for example, 2,000 N/mm² or less, or for example, 1,750 N/mm² or less.

Note that the tensile strength of this sieving wire mesh can be measured by a measurement method according to JIS Z 2241:2011 (Metallic materials-Tensile testing method).

4. Magnetic Separation Step and Magnetic Separator

This step is a step of removing the metal component from the resin powder or the inorganic powder containing the metal component after the sieving step using the magnetic separator (hereinafter, also referred to as "this magnetic separator").

The metal constituting the metal component is not particularly limited, and examples thereof include Fe and iron-based alloys (Fe, Cr, Ni, and Mo) such as various stainless alloys in consideration of the sieving wire mesh and the like.

Further, a magnetic metal is exemplified in consideration of removal. The metal component includes those containing at least such metal. The metal component exhibits magnetism as a whole, and is preferably, for example, attracted by magnetic force. Furthermore, a shape of the metal component is not particularly limited, and may be a spherical shape, a rod shape, a needle shape, a flake shape, or an indefinite shape.

This magnetic separator is a device that removes the metal component by the magnetic force, and examples of the magnetic force include a method using a magnet such as a permanent magnet and a method using electromagnetic force, but are not limited thereto. The method using the electromagnetic force is preferable in terms of being compact, being capable of efficiently forming a high magnetic flux density region and exhibiting high magnetic separation ability, being capable of removing foreign matters when energization is stopped and vibration is applied, and the like.

As this magnetic separator, removal of the metal component by the magnetic force is not particularly limited, and a known magnetic separator applicable to the resin powder or the inorganic powder can be used, and various devices are known, such as a bar magnet; various types of lattice magnets (permanent magnets) disposed in a flow path of the resin powder or the inorganic powder for magnetic separation; an electromagnetic separator (electromagnet) that adjusts magnetic flux to efficiently perform magnetic separation; a drum-type magnetic separator (permanent magnet) that is a device for performing magnetic separation by supplying the resin powder or the inorganic powder to a drum rotating using a magnetic material disposed inside the drum; a pulley-type magnetic separator that performs magnetic separation, on a belt, using the magnetic material in a pulley such as a high-magnetic force pulley or a magnet pulley; and a hanging magnetic separator (permanent magnet, electromagnet) used by being hung on a conveyor. Among them, the electromagnetic separator is preferable as described above, and the drum-type magnetic separator is also preferable from the viewpoint of magnetic separation efficiency and the like.

In removing the metal component by the magnetic force, a surface magnetic flux density of the magnet or the electromagnet to be used is not particularly limited, but can be, for example, 5,000 gauss or more. When it is 5,000 gauss or more, the metal component can be efficiently and reliably removed. As the magnetic flux density is higher, the metal component can be captured more efficiently, and the magnetic flux density is preferably 10,000 gauss or more, and more preferably 12,000 gauss or more.

EXAMPLES

Hereinafter, the present invention will be specifically described based on Examples. Note that the present invention is not limited to these Examples. Hereinafter, "parts" and "%" respectively mean parts by mass and mass % unless otherwise specified.

Production Example 1: Production of Resin Powder A

For polymerization, a reactor equipped with a stirring blade, a thermometer, a reflux condenser, and a nitrogen inlet tube was used.

A reactor was charged with 567 parts of acetonitrile, 2.20 parts of ion-exchanged water, 100.0 parts of acrylic acid (hereinafter, also referred to as "AA"), 0.90 parts of trimethylolpropane diallyl ether (trade name "Neoallyl T-20" manufactured by OSAKA SODA CO., LTD.) (corresponding to 0.30 mol % relative to the non-crosslinkable monomer), and triethylamine corresponding to 1.0 mol % relative to the AA. Inside of the reactor was sufficiently purged with nitrogen, and then heated to raise an internal temperature to 55° C. After confirming that the internal temperature was stabilized at 55° C., when 0.040 parts of 2,2'-azobis(2,4-dimethylvaleronitrile) (trade name "V-65" manufactured by FUJIFILM Wako Pure Chemical Corporation) was added as a polymerization initiator, since white turbidity was observed in the reaction solution, this point was defined as a polymerization initiation point. Note that the monomer concentration was calculated to be 15.0%. The polymerization reaction was continued while maintaining the internal temperature at 55° C. by adjusting an external temperature (water bath temperature), cooling of the reaction solution was started at a time point when 12 hours had elapsed from the polymerization initiation point, the internal temperature decreased to 25° C., and then 52.4 parts of lithium hydroxide monohydrate powder was added. After the addition, stirring was continued at room temperature for 12 hours to obtain a slurry-like polymerization reaction solution in which particles of carboxyl group-containing crosslinked polymer salt (Li salt, degree of neutralization: 90 mol %) were dispersed in a medium.

The obtained polymerization reaction solution was centrifuged to precipitate polymer particles, and then a supernatant was removed. Thereafter, a washing operation of redispersing a precipitate in acetonitrile having the same mass as that of the polymerization reaction solution and then precipitating the polymer particles by centrifugation to remove the supernatant was repeated twice. The precipitate was collected and dried at 80° C. for 3 hours under reduced pressure conditions to remove volatiles, thereby obtaining a powder (hereinafter, also referred to as a "resin powder A") of carboxyl group-containing crosslinked polymer salt that is the water-absorbing resin. Since the resin powder A had hygroscopicity, it was hermetically stored in a container having water vapor barrier properties. Note that the powder of the resin powder A was subjected to IR measurement, and when the degree of neutralization was determined from an intensity ratio of a peak derived from C=O group of carboxylic acid to a peak derived from C=O group of Li carboxylate, it was equal to a calculated value from preparation and was 90 mol %.

Note that the average primary particle diameter, which was the particle diameter at the volume-based frequency integrated value of 50% measured by the laser diffraction particle size distribution measuring machine, was 0.51 μm.

Production Example 2: Production of Resin Powder B

In the polymerization reaction, a reactor having a capacity of 2 L, which had a stirring mechanism including a pitched paddle type stirring blade and two vertical baffles, and further had a thermometer, a reflux condenser, and a nitrogen inlet tube, was used.

Note that the nitrogen inlet tube is branched into two parts outside the reactor, nitrogen can be supplied from one part, and a polymerization catalyst can be supplied from the other part using a pump. Further, the nitrogen inlet tube is connected to a reactor wall surface at substantially the same height as an upper end of the stirring blade. Further, the preparation was performed so that a total volume of the reaction solution was 1.7 L. Details are described below.

The reactor was charged with 2.0 parts of sorbitan monooleate (Rheodol AO-10 manufactured by Kao Corporation) as a dispersion stabilizer and further 165.0 parts of n-heptane as a polymerization solvent, and the mixture was stirred and mixed while maintaining temperature of the solution at 40° C. to prepare an oil phase. The oil phase was stirred at 40° C. for 30 minutes and then cooled to 20° C.

On the other hand, another container was charged with 100.0 parts of AA, 11.8 parts of polyethylene glycol diacrylate (trade name "ARONIX (registered trademark) M-243" manufactured by TOAGOSEI CO., LTD., average molecular weight: 425) (corresponding to 2.0 mol % relative to the non-crosslinkable monomer), 0.054 parts of hydroquinone, and 88.1 parts of ion-exchanged water, and the mixture was stirred and uniformly dissolved. Furthermore, 70.8 parts of 25% aqueous ammonia was slowly added and neutralized while cooling the mixture so as to maintain the temperature at 40° C. or lower to obtain a monomer mixed liquid.

After the rotation speed of the stirring blade was set to 770 rpm, 40% by mass (108.3 parts) of the prepared monomer mixed liquid was charged into the reactor to prepare a dispersion liquid in which the monomer mixed liquid was dispersed in the oil phase. At this time, the temperature in the reactor was maintained at 20° C. Further, oxygen in the reactor was removed by blowing nitrogen into the dispersion liquid. When 100 minutes passed after the monomer mixture was charged, an aqueous solution of 0.037 parts of sodium hydrosulfite and 1.21 parts of ion-exchanged water was added through a charging port provided in an upper portion of the reactor. After 3 minutes therefrom, a solution prepared by diluting 0.016 parts of a 80% solution of cumene hydroperoxide (trade name "PERCUMYL H80" manufactured by NOF CORPORATION) with 1.71 parts of n-heptane was supplied by the pump through the nitrogen inlet tube. Note that supply was performed in 30 seconds.

It was confirmed that the temperature in the reactor was immediately increased from the start of the supply and the polymerization started. An increase in the internal temperature reached a peak at about 50 seconds, and the temperature was 65.1° C. The reaction solution was cooled to a temperature of 20° C., and then the remaining 60% (162.5 parts) of the prepared monomer mixed liquid was added to the reaction solution and dispersed.

When 30 minutes passed after the monomer mixture was charged, the rotation speed of the stirrer was increased to 1.5 times, and an aqueous solution of 0.05 parts of sodium hydrosulfite and 1.71 parts of ion-exchanged water was immediately added through the charging port provided in the upper portion of the reactor. After 3 minutes therefrom, a solution prepared by diluting 0.023 parts of PERCUMYL H80 with 1.71 parts of n-heptane was supplied by the pump through the nitrogen inlet tube. Note that the supply was performed in 45 seconds.

It was confirmed that the temperature in the reactor was immediately increased from the start of the supply and the polymerization started. The increase in the internal temperature reached a peak in about 60 seconds, and the temperature was 64.6° C.

Thereafter, the reaction solution was cooled to room temperature to obtain a dispersion liquid of carboxyl group-containing crosslinked polymer salt. The washing operation of precipitating the polymer particles by centrifugation to remove the supernatant was repeated twice. The precipitate was collected and dried at 80° C. for 3 hours under the reduced pressure conditions to remove the volatiles, thereby obtaining a powder (hereinafter, also referred to as a "resin powder B") of a carboxyl group-containing crosslinked polymer salt as the water-absorbing resin.

Note that the average primary particle diameter, which was the particle diameter at the volume-based frequency integrated value of 50% measured by the laser diffraction particle size distribution measuring machine, was 11.0 µm.

Production Example 3: Production of Inorganic Powder C 1345 mL of deionized water and 13.5 g of 35% hydrochloric acid were charged into a 2 L round-bottom flask, 225 g of a 20% aqueous solution of zirconium oxychloride octahydrate containing 0.018% of hafnium was added thereto, and then 93 g of oxalic acid dihydrate was added thereto for dissolution.

While this solution was stirred, 101 g of 75% phosphoric acid was added. This was heated to 98° C. over 2 hours, and then refluxed for 12 hours with stirring. After cooling the reaction system, the obtained precipitate was collected by filtration, washed with water, and then dried at 105° C. under normal pressure to obtain an inorganic ion exchanger (hereinafter, also referred to as "inorganic powder C").

Note that the average primary particle diameter, which was the particle diameter at the volume-based frequency integrated value of 50% measured by the laser diffraction particle size distribution measuring machine, was 0.78 µm.

<<Preparation of Sieving Wire Mesh>>

A wire mesh of SUS329J1 (trade name "Magnestain" manufactured by MANABE KOGYO CO., LTD.; mesh opening 154 µm, wire diameter 100 µm, Vickers hardness 320 HV, tensile strength 590 N/mm$^2$) was bonded and fixed to a mold form of a test sieve having an inner diameter of 200 mm and a depth of 45 mm to prepare a sieving wire mesh (hereinafter, also referred to as "M-1").

Tension of the sieving wire mesh was adjusted to 10 to 15 N/cm as a measurement value by a tension meter (Tensocheck 100-R manufactured by Sefar).

Sieving wire meshes M-2 and M-3 were prepared in the same manner as in M-1 except that the mesh opening, the wire diameter, and a sieving area of the sieving wire mesh were changed as described in Table 1.

Sieving wire meshes M-4 and M-5 were prepared in the same manner as in M-1 except that the material of the sieving wire mesh was changed to SUS431 (Vickers hardness: 240 HV, tensile strength: 780 N/mm$^2$) and SUS304 (Vickers hardness: 200 HV, tensile strength: 520 N/mm$^2$).

Sieving wire meshes M-6 and M-7 were prepared in the same manner as in M-1 except that the mesh opening, the wire diameter, and the sieving area of the sieving wire mesh were changed as described in Table 1.

Note that the Vickers hardness of each sieving wire mesh is a value measured as follows according to JIS Z 2244:2009 (Vickers hardness test-Test method).

Using an ultra-microhardness tester (H-100C manufactured by FISCHER INSTRUMENTS K.K.), the Vickers hardness of each sieve wire mesh was measured under a condition that the maximum load of a Vickers indenter was 20 mN at a temperature of 23° C.

In addition, the tensile strength of the material constituting each sieving wire mesh is a value of the maximum strength when measured as follows according to JIS Z 2241:2011 (Metallic materials-Tensile testing method).

A No. 5 test piece (JIS Z 2201:1998) was punched out from a material (thickness: 1.0 mm) constituting each sieving wire mesh, and the tensile strength was measured using a tensile tester (Autograph AG-Xplus manufactured by Shimadzu Corporation). Measurement was performed in an environment of a temperature of 23° C. and a humidity of 50% at a stress increase rate of 15 N/(mm²s) up to a lower yield point and thereafter at a strain rate of 35%/min.

Example 1

1. Sieving Step: Measurement of Sieving Speed

A sieving wire mesh M-1 set in an ultrasonic vibration sieving machine (ANAKYSETTE3 manufactured by FRITSCH) was charged with 300 g of the resin powder A as a powder to be processed, and a sieving test was performed with an ultrasonic output of 100% and an amplitude of 2 mm.

Thereafter, mass of the powder that passed after 1 minute was measured and found to be 118 g, and as a result of calculating a sieving speed per unit sieving area per unit time, it was found to be 236 kg/m²·h.

2. Magnetic Separation Step: Removal Test of Metal Component 50 g of the resin powder A having passed through the sieving step was weighed, and the powder was caused to pass between two lattice permanent magnets with sheath pipe of 30 mmΦ and 12,000 Gauss to perform the magnetic separation step.

The sheath pipe excluding the permanent magnets was washed with 3 L of filtered distilled water, and the washing water was subjected to suction filtration with filter paper (5B manufactured by ADVANTEC CO., LTD.) to obtain a filter paper (1) (first pass).

The same operation was repeated for the resin powder A obtained in the first pass to obtain a filter paper (2) (second pass).

The same operation was repeated for the resin powder A obtained in the second pass to obtain a filter paper (3) (third pass).

Each of the filter papers (1) to (3) was measured for the number of metal components having a major axis of 50 μm or more using an optical microscope (DSX110 manufactured by Olympus Corporation) and image analysis software (OLYMPUS Stream manufactured by Olympus Corporation).

As a result, the number of metal components was 3 for the first pass, 1 for the second pass, and 0 for the third pass. This means that the metal component could be easily removed in the second pass.

Examples 2 to 4 and Comparative Examples 1 to 3

The sieving step and the magnetic separation step were performed in the same operation as in Example 1 except that the sieving wire mesh was changed as described in Table 1. The results are shown in Table 1.

Examples 5 and 6

The sieving step and the magnetic separation step were performed in the same operation as in Example 1 except that the powder to be processed was changed as described in Table 2. The results are shown in Table 2.

Comparative Examples 4 and 5

The sieving step and the magnetic separation step were performed in the same operation as in Example 1 except that the powder to be processed and the sieving wire mesh were changed as described in Table 2. The results are shown in Table 2.

TABLE 1

| | Example and Comparative Example | | Example 1 | Example 2 | Example 3 | Example 4 | Comparative Example 1 | Comparative Example 2 | Comparative Example 3 |
|---|---|---|---|---|---|---|---|---|---|
| | Powder to be processed | | Resin powder A | | | | | | |
| | Sieving wire mesh | | M-1 | M-2 | M-3 | M-4 | M-5 | M-6 | M-7 |
| | Material of sieving wire mesh | | SUS329JI | SUS329JI | SUS329JI | SUS431 | SUS304 | SUS304 | SUS304 |
| | Vickers hardness [HV] | | 320 | 320 | 320 | 240 | 200 | 200 | 200 |
| | Mesh opening [μm] | | 154 | 154 | 104 | 154 | 154 | 154 | 104 |
| | Wire diameter [μm] | | 100 | 100 | 50 | 100 | 100 | 100 | 50 |
| | Sieving area [m²] | | 0.03 | 0.6 | 0.03 | 0.03 | 0.03 | 0.6 | 0.03 |
| Evaluation results | Sieving step | Sieving speed [kg/m² h] | 236 | 221 | 102 | 205 | 143 | 52 | 62 |
| | Magnetic separation step (the mumber of metal components on filter paper) | First pass [pieces] | 3 | 4 | 2 | 2 | 1 | 1 | 1 |
| | | Second pass [pieces] | 1 | 0 | 1 | 2 | 1 | 1 | 2 |
| | | Third pass [pieces] | 0 | 0 | 0 | 0 | 2 | 1 | 1 |

TABLE 2

| Example and Comparative Example | Example 5 | Comparative Example 4 | Example 6 | Comparative Example 5 |
|---|---|---|---|---|
| Powder to be processed | Resin powder B | | Inorganic powder C | |
| Sieving wire mesh | M-1 | M-5 | M-1 | M-5 |
| Material of sieving wire mesh | SUS329JI | SUS304 | SUS329JI | SUS304 |
| Vickers hardness [HV] | 320 | 200 | 320 | 200 |
| Mesh opening [μm] | 154 | 154 | 154 | 154 |
| Wire diameter [μm] | 100 | 100 | 100 | 100 |
| Sieving area [m²] | 0.03 | 0.03 | 0.03 | 0.03 |

TABLE 2-continued

|  |  |  | Example 5 | Comparative Example 4 | Example 6 | Comparative Example 5 |
|---|---|---|---|---|---|---|
| Evaluation results | Sieving step | Sieving speed [kg/m² h] | 512 | 331 | 325 | 125 |
| | Magnetic separation step (the number of metal components on filter paper) | First pass [pieces] | 3 | 1 | 2 | 1 |
| | | Second pass [pieces] | 0 | 1 | 0 | 1 |
| | | Third pass [pieces] | 0 | 1 | 0 | 1 |

Evaluation Results

As is apparent from the results of Examples 1 to 6, it has been found that by using the production method and production apparatus of the present invention, the sieving speed is high and the metal components generated from the sieving wire mesh itself can be easily removed even when any of the resin powder to be processed and the inorganic powder to be processed is used. Among them, focusing on the Vickers hardness (resin powder A: comparison between Examples 1 and 4) of the sieving wire mesh, the higher the hardness, the higher the sieving speed (Example 1).

In contrast, when the sieving step was performed using a sieving wire mesh having a Vickers hardness of less than 220 HV, the sieving speed was low even when any of the resin powder to be processed and the inorganic powder to be processed is used (Comparative Examples 1 to 5).

The invention claimed is:

1. A method for producing a resin powder or an inorganic powder, the method comprising:
    a sieving step of sieving a resin powder to be processed or an inorganic powder to be processed using a sieving wire mesh having a Vickers hardness of 220 HV to 320 HV; and
    a magnetic separation step of removing, from a resin powder or an inorganic powder containing a metal component after the sieving step, the metal component using a magnetic separator, wherein
    the resin powder contains a crosslinked polymer, and
    the inorganic powder contains an inorganic ion exchanger.

2. The production method according to claim 1, wherein a tensile strength of a material constituting the sieving wire mesh is 500 N/mm² or more.

3. The production method according to claim 1, wherein the crosslinked polymer is a water-absorbing resin.

4. An apparatus for producing a resin powder or an inorganic powder, the apparatus comprising: a sieving wire mesh having a Vickers hardness of 220 HV to 320 HV; and a magnetic separator, wherein
    the resin powder contains a crosslinked polymer, and
    the inorganic powder contains an inorganic ion exchanger.

5. The apparatus for producing the resin powder or the inorganic powder according to claim 4, wherein a tensile strength of a material constituting the sieving wire mesh is 500 N/mm² or more.

* * * * *